Aug. 15, 1933.    C. L. McMULLEN    1,922,056
METER RECORDING MECHANISM
Filed Aug. 20, 1932    4 Sheets-Sheet 1

Inventor
Carlton L. McMullen
By Frederick E. Bromley
Attorney.

Aug. 15, 1933.  C. L. McMULLEN  1,922,056
METER RECORDING MECHANISM
Filed Aug. 20, 1932  4 Sheets-Sheet 2
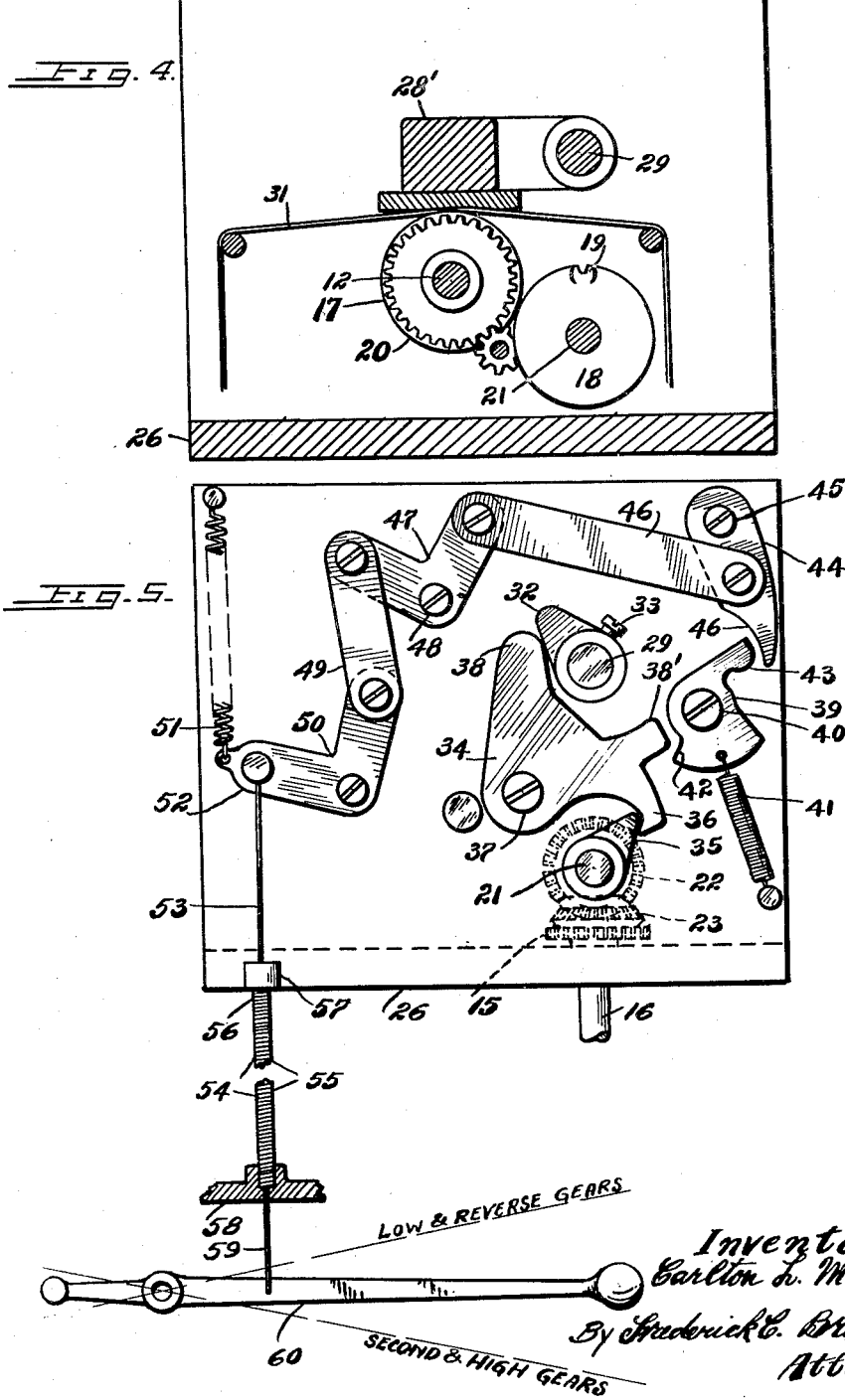

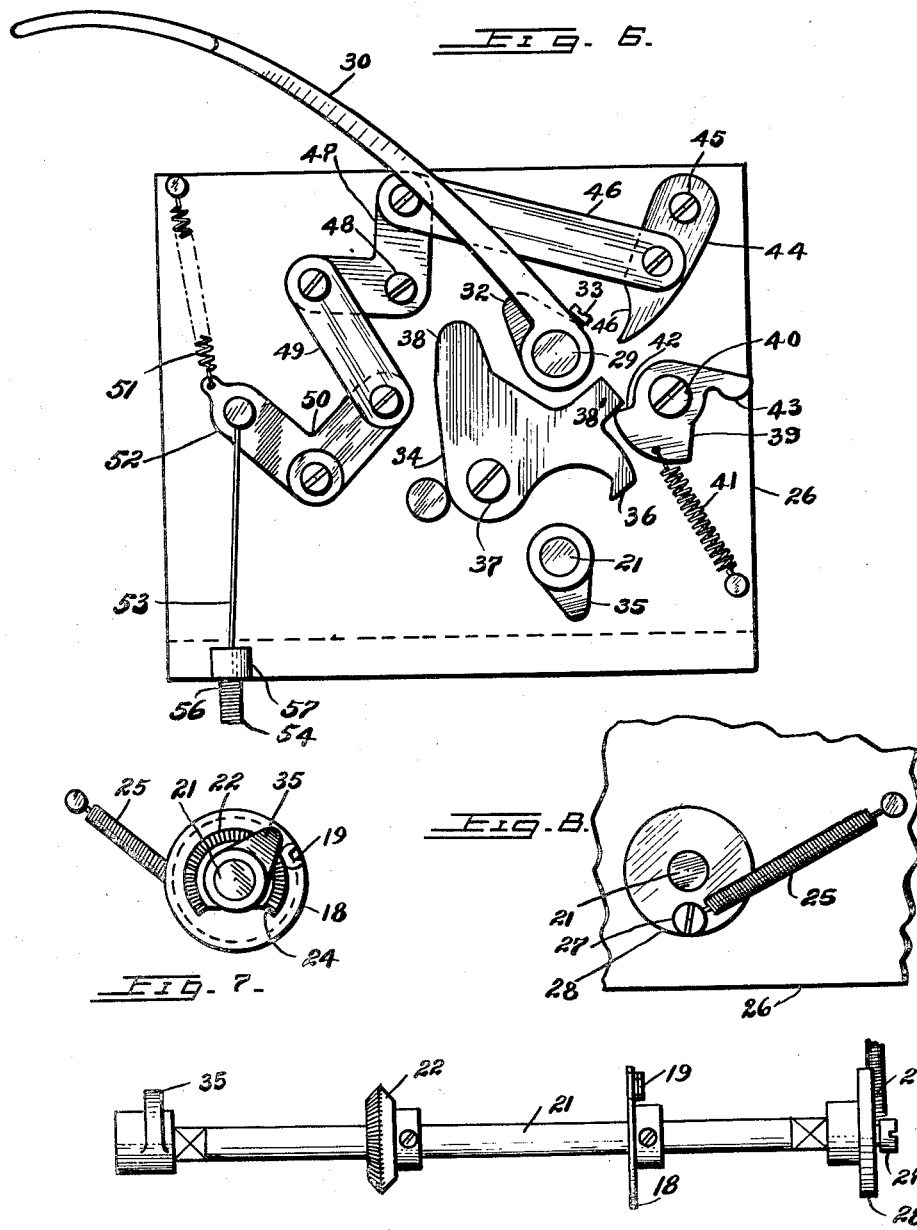

Patented Aug. 15, 1933

1,922,056

UNITED STATES PATENT OFFICE 1,922,056

METER RECORDING MECHANISM

Carlton L. McMullen, Toronto, Ontario, Canada, assignor to Patent Enterprises Limited Application August 20, 1932. Serial No. 629,635

17 Claims. (Cl. 234—35)

The invention appertains, in particular, to a meter recording device for a fuel-oil truck and operates to record a saleslip showing the quantity of oil dispensed et cetera, together with the number of the saleslip; all being for the purpose of keeping a positive check upon dispensation of fuel-oil from the individual truck. The recording device is directly geared to the meter and the saleslip register wheels are actuated independently of such gearing.

In a copending application filed by me on March 19th, 1932, Serial Number 599,892 for "Recording device mechanism for meters", I set forth a device of this nature that aimed to render the recording instrument foolproof in order to preclude the truck driver from cheating his employer's customer by short delivery and selling for his own profit the quantity of fuel oil he has cheated him out of. This was achieved by special mechanism designed to automatically record a new sales number each time oil is dispensed irrespective of the quantity. The mechanism involved an inertia contrivance and as an alternative an electro-magnetic device associated with the hose valve.

The present invention herein set forth has the same general object in view, but the means to this end are utterly different in that the saleslip register wheels are controlled by mechanism associated with the gear-shift lever of the truck. It has been demonstrated that since this lever has to be shifted in moving the truck from one place of delivery to that of another, advantage can be taken of it to best achieve the desired result.

Referring to the accompanying drawings, Figure 1 is a side elevation of the recording mechanism in which an independent manual control mechanism is shown raised.

Figure 4 is a similar cross section to Figure 2, but shows the depressible head lowered.

Figure 5 is an end elevation illustrating the saleslip operating mechanism in its disengaged position.

Figure 6 is a similar view but showing the saleslip mechanism in its tripped position.

Figure 7 is a left hand end view of Figure 9.

Figure 8 is a detail of a spring for imparting a partial turning movement to the shaft of the saleslip register wheels.

Figure 9 is a view of the gear shaft of the saleslip mechanism.

Like numerals of reference indicate corresponding parts in each of the figures throughout the drawings.

Figure 1:
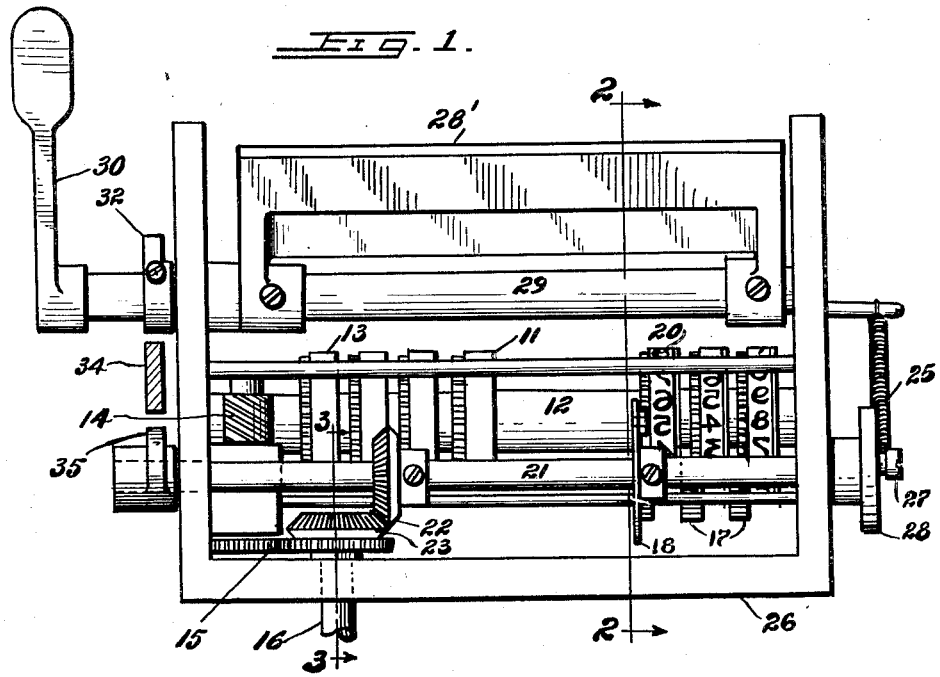
Figure 2:
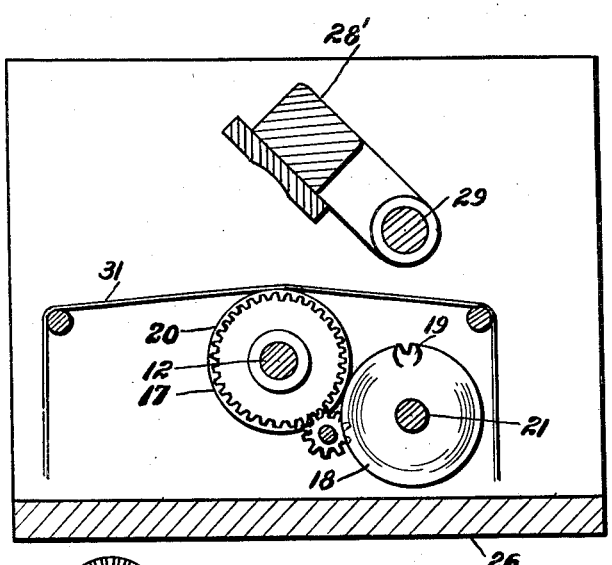
Figure 2 is a cross sectional view taken on the line 2—2 of Figure 1.

In order to gain a comprehensive understanding of the invention it is first necessary to review relevant elements of the recording device, which are given by way of illustration rather than limitation as it is manifest that changes and modifications may take place in these elements without departing from the spirit and scope of the invention.

The reference numeral 11 denotes the set of register wheels for recording the gallonage of fluid dispensed. These wheels are mounted upon a dead shaft 12 and the unit wheel 13 is driven from a worm drive 14, which in turn is geared as at 15 to the spindle 16 that extends from the meter. The spindle is operated by and in accordance with the flow of oil through the meter as is well known in the art.

Figure 3:
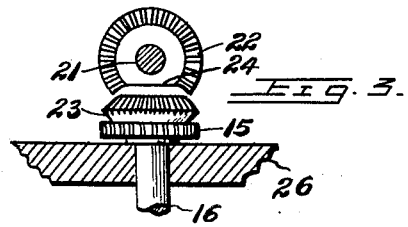
Figure 3 is a detail view of the gearing for the saleslip register wheels, which view is taken on line 3—3 of Figure 1.

Also mounted upon the shaft 12 is a set of register wheels 17 for recording the number of the saleslip. These wheels are operated by a disc 18 that has an offset pair of teeth 19 which turn the unit wheel 20 fractionally each time the disc makes a complete turn. This advances the saleslip wheels numerically as is well understood. A shaft 21 carries the disc which is made fast thereon, and this shaft also carries a fixed bevel gear 22 that meshes with a similar gear 23 integral with or secured to the gearing 15 of the spindle 16. The bevel gear 22 is segmental, that is, part of its teeth are cut away as at 24 so that in one position of the gear it is disengaged from its companion—see in particular Figure 3. The segmental is normally retained in its disengaged position by means hereinafter detailed, and when released is turned to bring it into engagement with its companion by means of the tension spring 25. One end of this helical spring is attached to the bracket 26 that supports the various parts of the device, while the other end is attached to an eccentric pin 27 on the plate 28 fixed on the shaft 21.

A depressible head 28' is mounted over the several sets of register wheels and is swingably borne by a rod 29 journalled in the bracket 26. An end of the rod projects from the bracket and has a handle 30 by which it is depressed so as to impress the paper 31 on the register wheels. The head is normally held elevated by a spring, not shown. The paper is in roll form as usual and is fed over the register wheels in multiple sheets. Each time the head is depressed it records a saleslip of the quantity of fuel oil dispensed together with the sales number.

Having described the structure to which the invention relates, the invention itself will now be recounted:

The rod 29 is supplied with a cam 32 fixed thereon by means of a grub screw 33. This cam is adapted to actuate a detent 34 which in turn engages a cam 35 secured to the shaft 21. The detent has a catch portion 36 that normally is engaged with the cam 35 in order to retain the bevel gear 24 out of engagement with its companion. The detent is pivoted at 37 and has a finger portion 38 in the path of the cam 32. It will be manifest that as the handle is depressed the cam 32 is urged into engagement with the finger 38 of the detent and thus swings the catch away from the other cam 35. The spring 25 is then free to turn the shaft 21 to bring the segmental gear in mesh with its companion. In this manner the subsequent rotation of the spindle 16 turns the segmental gear around and as it is turned the disc imparts a fractional turn to the unit wheel of the saleslip register wheels to indicate a new saleslip. As the segmental gear again arrives at its disengaged position the detent engages the cam 35 to secure it in this position for recurrent operation.

The detent has an additional finger 38' for contact with a trip 39 pivoted at 40 and normally held clear of the detent by a tension spring 41. The trip has a striking face 42 and a finger 43 that is disposed in the path of an actuator 44. This actuator is pivoted at 45 and has a curved face 46 that engages the finger of the trip as it is swung toward it so as to turn the trip away from the detent and increase the spring tension. The actuator is pulled by a bellcrank mechanism and as it sweeps forwardly its engagement with the finger 43 carries the trip through a definite angle and then releases it. This sudden release causes the trip to swing back and kick the finger 38' of the detent with its striking face 42. This disengages the cam 35 permitting the segmental gear to engage its companion as heretofore explained.

The actuator 44 is connected by a link 46 to a bellcrank 47 pivoted at 48. This bellcrank is connected by a link 49 to a bellcrank 50 upon which pressure is applied by a tension spring 51. The arm 52 of this bellcrank is attached to the inner member 53 of a Bowden wire 54, the tubular member 55 has its end 56 connected at 57 to the bracket. The other end of the tubular member is connected to a stationary element 58 which may be the transmission casing of the truck or some other element provided for this purpose. The other end 59 of the inner member is secured to the gear shift 60 of the transmission: see Figure 5. Accordingly, when the lever is in its neutral position, represented in Figure 5, the bellcrank mechanism holds the actuator clear of the trip. However, when the lever is shifted into gear, either one way or the other, the inner member 53 shifts the bellcrank so as to throw the link 49 to one side or the other of dead centre. This pulls on the bellcrank 47 and the pull is transmitted to the actuator to cause it to operate the trip 39 as previously explained. It should be manifest then that the essential feature of this mechanism is that no matter what gear the lever is shifted into the bellcrank mechanism translates the movement into a pull upon the actuator. Consequently the truck cannot be moved without causing the saleslip mechanism to be operated in order to register a new sale independently of the handle 30.

Figure 10:
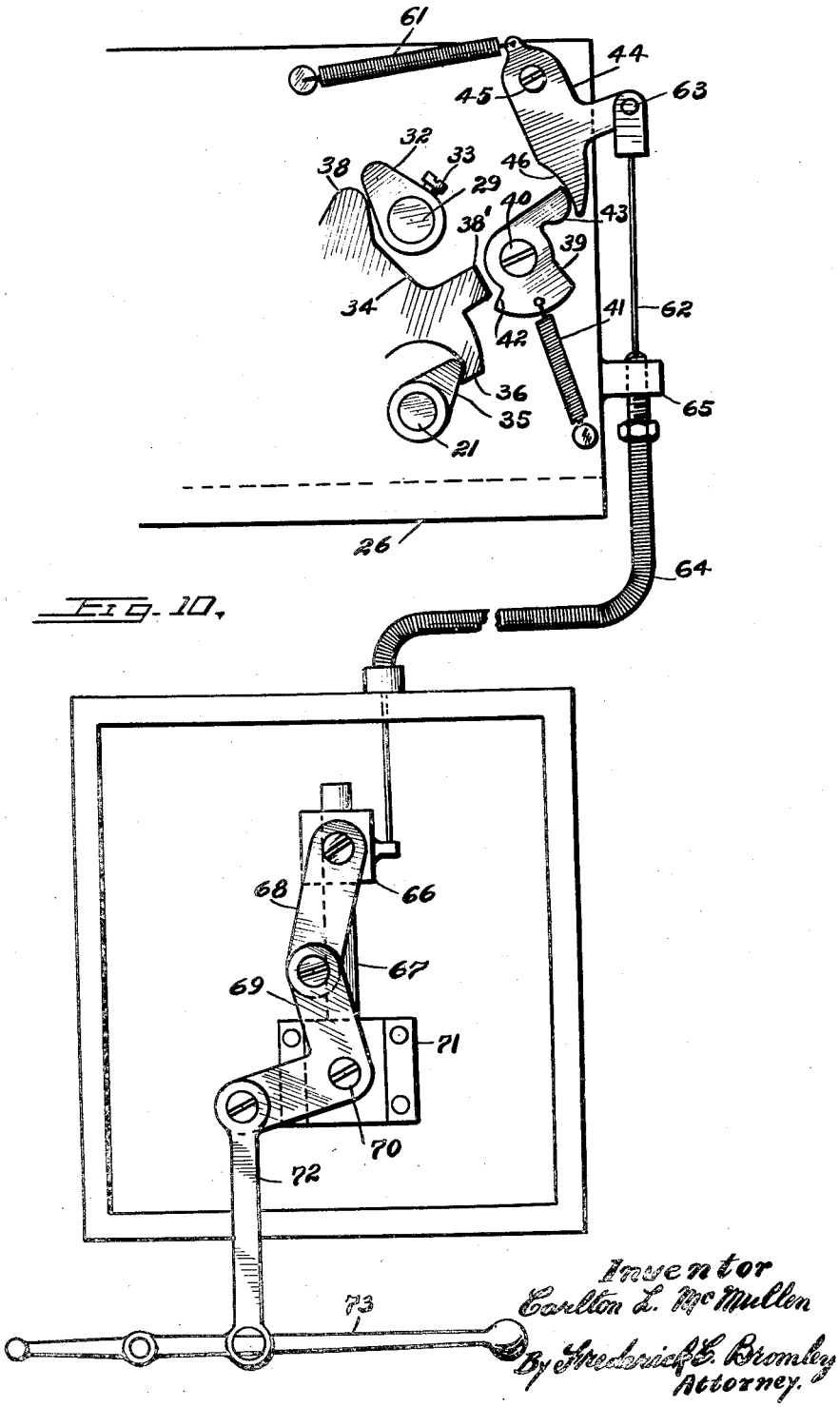
Figure 10 is a a general view of a slightly modified form of the invention.

A similar result is obtained by the modification shown in Figure 10, but here the bellcrank mechanism is located at the gear shift lever rather than at the actuator. The actuator is spring urged at 61 away from the trip 39.

The Bowden wire has its inner member 62 swivelly attached at 63 to the actuator and its tubular member 64 attached at 65 to the bracket. The other end of the inner member is attached to a block 66 slidably mounted on a guide 67; which block is connected by a link 68 to a bellcrank 69 pivoted at 70 to a base 71. A connecting rod 72 unites the bellcrank to the gear-shift lever 73 of the truck transmission.

In operation, movement of the lever 73 in either direction pulls the block 66 which in turn pulls the inner member 62 and thus urges the actuator to operate the trip.

In the operation of this device, the register wheels 11 for denoting the gallonage of fluid dispensed are initially set to zero, while the register wheels 17 are set to indicate the first saleslip. In dispensing oil the spindle 16 is rotated by its connection with the meter and the gearing 14 and 15 communicates this rotation to the wheels 11 which in this manner register the gallonage dispensed.

At the completion of the delivery the handle 30 is manually depressed in order that the head 28' may taken an impression of the amount dispensed and the saleslip number, which is recorded on the saleslip.

Concurrently with the lowering of the head the cam 32 is swung into engagement with the detent 34 in order to release the cam 35. The spring 25 thereupon turns the shaft until the gear 22 contacts with the gear 23 which is at rest at this time. The gear 23 is however turned in making the next delivery of oil and thus serves to turn the gear 22 for nearly a complete revolution until disengagement is caused by the flat section 24, at which time the detent 34 reengages the cam 35. The turn of the gear 22 fractionally advances the unit wheel 20 to bring the next saleslip number into position. Accordingly the next depression of the head records the delivery of oil and the new saleslip. In this manner each depression of the head releases the cam 35 so that the succeeding dispensing of oil causes a new saleslip number to be brought into position for recording.

Independently of the handle 30, the moving of the fuel truck itself sets the mechanism for recording a new saleslip number upon the ensuing dispensing of oil. This is evident in that movement of the gear-shift lever 60 in either direction actuates the bellcrank 50 thus pulling on the actuator 44. The actuator swings the trip 39 away from the detent 34 and suddenly releases it in order that it may strike the finger 38' of the detent and throw it out of engagement with the cam 35. Thus released, the aforesaid cam 35 turns with the shaft 21 and gear 22 under the influence of the spring 25 until this gear meshes with its companion 23.

It now follows that the ensuing delivery of oil will turn the gear 22 through its connection with the meter-spindle gear 23 with the result that a fresh saleslip will be indicated by the register wheels 17. As already recounted, as the cam 35 makes a full turn it is again engaged by the part 36 and held ready for recurrent operation.

It will be manifest that this invention provides a simple and serviceable mechanism that ensures recording of a saleslip at each place of delivery independent of manual manipulation and it is apparent that various changes and modifications may be resorted to as coming within the spirit and scope of the appended claims.

What I claim is:—

1. In a device of the class described, a set of register wheels, a depressible head therefor, a driven element of a meter actuated by fluid flowing therethrough, means connected to said driven element for fractionally advancing the register wheels each time the driven element is set in operation, said means having a disengaged position to sever the driving connection, a cam connected to the depressible head, and releasable mechanism normally restraining the said means in its disengaged position, said cam being adapted to release said mechanism upon depression of the head.

2. In a device of the class described, a set of register wheels, a depressible head therefor, a driven element of a meter actuated by fluid flowing therethrough, means connected to said driven element for fractionally advancing the register wheels each time the driven element is set in operation, said means having a disengaged position to sever the driving connection, a revolvable cam connected to the depressible head, a detent actuated thereby, and an agent restrained by said detent to retain the aforesaid means in its disengaged position.

3. In a device of the class described, a set of register wheels, a depressible head therefor, a driven element of a meter actuated by fluid flowing therethrough, means connected to said driven element for fractionally advancing the register wheels each time the driven element is set in operation, said means having a disengaged position to sever the driving connection, a cam adapted to be turned by the depressible head, a detent having an integral finger in the path of the cam, and an agent restrained by said detent to retain the aforesaid means in its disengaged position.

4. In a device of the class described, a set of register wheels, a depressible head therefor, a driven element of a meter actuated by fluid flowing therethrough, means connected to said driven element for fractionally advancing the register wheels each time the driven element is set in operation, said means having a disengaged position to sever the driving connection, a cam adapted to be turned by the depressible head, a detent actuated thereby, said detent having an integral catch portion, and a member restrained by said catch portion of the detent to retain the aforesaid means in its disengaged position.

5. In a device of the class described, a register wheel unit, a shaft journalled in juxtaposition thereto, a member borne by the shaft to operate the register wheel unit, a meter spindle, a gear thereon, a companion gear on the shaft having segmental teeth by which it is disengaged in one position, means for urging it into engagement with its companion, a cam fast on the shaft, a detent engageable with the cam to restrain the segmental gear in its disengaged position, and a cam for connection with a depressible head and adapted to trip the detent.

6. The combination with a register wheel unit, a driven element of a meter actuated by fluid flowing therethrough, and means associated with the driven element to advance the register wheel unit each time the driven element is operated and to disengage itself so as to sever the driving connection, of mechanically operated mechanism associated with the gear-shift lever of a transmission to cause reengagement of the said means with the driven element upon movement of said lever.

7. The combination with a register wheel unit, a driven element of a meter actuated by fluid flowing therethrough, and means associated with the driven element to advance the register wheel unit each time the driven element is operated and to disengage itself so as to sever the driving connection, of mechanically operated mechanism associated with the gear-shift lever of a transmission to cause reengagement of the said means with the driven element irrespective of the direction of movement of the lever.

8. The combination with a register wheel unit, a driven element of a meter actuated by fluid therethrough, and means associated with the driven element to advance the register wheel unit each time the driven element is operated and to disengage itself so as to sever the driving connection, of mechanically operated mechanism associated with the gear-shift lever of a transmission and involving a bell-crank motion to cause reengagement of the said means with the driven element irrespective of the direction of movement of the lever.

9. The combination with a register wheel unit, a driven element of a meter actuated by fluid flowing therethrough, and means associated with the driven element to advance the register wheel unit each time the driven element is operated and to disengage itself so as to sever the driving connection, of mechanically operated mechanism associated with the gear-shift of a transmission and involving a bell-crank motion to cause reengagement of the said means with the driven element irrespective of the particular gear selected.

10. The combination with a register wheel unit, a driven element of a meter actuated by fluid flowing therethrough, and means associated with the driven element to advance the register wheel unit each time the driven element is operated and to disengage itself so as to sever the driving connection, of a cam connected to said means, a detent normally engaged with the cam, and mechanism associated with the gear-shift of a transmission to actuate the detent.

11. The combination with a register wheel unit, a driven element of a meter actuated by fluid flowing therethrough, and means associated with the driven element to advance the register wheel unit each time the driven element is operated and to disengage itself so as to sever the driving connection, of a cam connected to said means, a detent pivotally mounted and having a catch portion engaged with the cam, and mechanism associated with the gear-shift of a transmission to actuate the detent.

12. The combination with a register wheel unit, a driven element of a meter actuated by fluid flowing therethrough, and means associated with the driven element to advance the register wheel unit each time the driven element is operated and to disengage itself so as to sever the driving connection, of a cam connected to said means, a detent normally engaged with the cam and having an integral finger, a trip adapted to engage the finger to actuate the detent, and mechanism associated with the gear-shaft of a transmission for operating the detent by the shifting of the lever.

13. The combination with a register wheel unit, a driven element of a meter actuated by fluid flowing therethrough, and means associated with the driven element to advance the register wheel unit each time the driven element is operated and to disengage itself so as to sever the driving connection, of a cam connected to said means, a detent normally engaged with the cam and having an integral finger, a pivoted trip spring held in close proximity to the finger and having a kicking face for engagement therewith, and mechanism associated with the gear-shift lever of a transmission for causing the trip to kick the detent as the lever is shifted.

14. The combination with a register wheel unit, a driven element of a meter actuated by fluid flowing therethrough, and means associated with the driven element to advance the register wheel unit each time the driven element is operated and to disengage itself so as to sever the driving connection, of a cam connected to said means, a detent normally engaged with the cam, a trip adapted to kick the detent free of said cam, an actuator pivotally mounted and having a curved face contacting with the trip, and mechanism associated with the gear-shift lever of a transmission for causing the actuator to operate the trip as the lever is shifted.

15. The combination with a register wheel unit, a driven element of a meter actuated by fluid flowing therethrough, and means associated with the driven element to advance the register wheel unit each time the driven element is operated and to disengage itself so as to sever the driving connection, of a cam connected to said means, a tripping mechanism, a pivotally mounted actuator therefor, a bellcrank connection for exerting a pull in one direction on the actuator, and a flexible connection attached to the bellcrank connection and associated with the gear-shift lever of a transmission to operate the actuator as the lever is shifted.

16. The combination with a register wheel unit, a driven element of a meter actuated by fluid flowing therethrough, and means associated with the driven element to advance the register wheel unit each time the driven element is operated and to disengage itself so as to sever the driving connection, of a cam connected to said means, a tripping mechanism, a pivotally mounted actuator therefor, a link connected thereto, a bellcrank having an arm connected to said link, a link connected to the other arm of the bell crank, a bellcrank connected to the second mentioned link, and a Bowden wire operably attaching the last mentioned bellcrank to the shift lever of a transmission.

17. In a device of the class described, a segmental gear normally urged into engagement with a companion gear, a cam connected therewith, a detent engaged with the cam to restrain the segmental gear, a trip adapted to kick the detent clear of the cam, an actuator therefor, a Bowden wire for connection to the gear-shift lever of a transmission, and a bellcrank mechanism attached to the Bowden wire and arranged to exert a pull on the actuator irrespective of the direction of movement of the lever.

CARLTON L. McMULLEN.